US010491886B2

(12) United States Patent
 Aflaki Beni (10) Patent No.: US 10,491,886 B2
(45) Date of Patent: Nov. 26, 2019

(54) VIRTUAL REALITY DISPLAY

(71) Applicant: Nokia Technologies Oy, Espoo (FI)

(72) Inventor: Payman Aflaki Beni, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/820,380

(22) Filed: Nov. 21, 2017

(65) Prior Publication Data

US 2018/0176545 A1   Jun. 21, 2018

(30) Foreign Application Priority Data

Nov. 25, 2016  (GB) .................................. 1619942.4

(51) Int. Cl.
*H04N 13/111* (2018.01)
*H04N 13/117* (2018.01)
(Continued)

(52) U.S. Cl.
CPC .......... *H04N 13/282* (2018.05); *G01S 17/48* (2013.01); *G01S 17/66* (2013.01); *G01S 17/87* (2013.01); *G01S 17/89* (2013.01); *H04N 5/232* (2013.01); *H04N 5/23238* (2013.01); *H04N 13/111* (2018.05); *H04N 13/117* (2018.05); *H04N 13/156* (2018.05); *H04N 13/344* (2018.05);
(Continued)

(58) Field of Classification Search
CPC .. H04N 13/279; H04N 13/282; H04N 13/344; H04N 13/366; H04N 13/156; H04N 13/111; H04N 13/117
See application file for complete search history.

(56) References Cited

U.S. PATENT DOCUMENTS 5,850,352 A * 12/1998 Moezzi ................ H04N 13/139
                                                               345/419
5,900,849 A    5/1999 Gallery
(Continued)

FOREIGN PATENT DOCUMENTS

DE        195 28 425 C1 *  8/1995  ............. H04N 13/00

OTHER PUBLICATIONS

Gao et al., "Rate-Complexity Tradeoff for Client-Side Free Viewpoint Image Rendering", IEEE ICIP 2013 (Year: 2013).*
(Continued)

*Primary Examiner* — Robert J Hance
(74) *Attorney, Agent, or Firm* — Alston & Bird LLP (57) ABSTRACT

A method is disclosed, comprising providing image data from each of at least two multi-camera devices at different locations in a capture space, each multi-camera device including at least two cameras for capturing respective different images in the capture space, and providing first positional data indicating the respective fields-of-view of each camera of each multi-camera device. In addition, the method may comprise receiving second positional data from a user device indicating the position and orientation of the user device in a virtual space corresponding to the capture space, and selecting, based on the first and second positional data, at least one camera from each of at least two of the multi-camera devices. Using the image data from the selected cameras, a synthesised image may be generated representing a field-of-view of the virtual space from the position and orientation of said user device for presentation on a display screen of said user device.

20 Claims, 8 Drawing Sheets

(51) Int. Cl.
*H04N 13/282* (2018.01)
*H04N 13/156* (2018.01)
*H04N 13/344* (2018.01)
*H04N 13/366* (2018.01)
*H04N 5/232* (2006.01)
*G01S 17/48* (2006.01)
*G01S 17/66* (2006.01)
*G01S 17/87* (2006.01)
*G01S 17/89* (2006.01)
*H04N 13/00* (2018.01)

(52) U.S. Cl.
CPC ... *H04N 13/366* (2018.05); *H04N 2013/0081* (2013.01)

(56) References Cited

U.S. PATENT DOCUMENTS

| | | | |
|---|---|---|---|
| 6,133,944 A * | 10/2000 | Braun | H04N 5/232 348/39 |
| 7,263,206 B1 | 8/2007 | Milbert | |
| 8,274,564 B2 | 9/2012 | Girgensohn et al. | |
| 8,675,073 B2 | 3/2014 | Aagaard et al. | |
| 9,277,101 B2 | 3/2016 | Hubner et al. | |
| 9,298,986 B2 | 3/2016 | Ferlatte et al. | |
| 9,573,062 B1 * | 2/2017 | Long | H04N 13/117 |
| 2011/0157327 A1 * | 6/2011 | Seshadri | G06F 3/14 348/51 |
| 2012/0127284 A1 | 5/2012 | Bar-Zeev et al. | |
| 2013/0101015 A1 * | 4/2013 | He | H04N 21/234327 375/240.02 |
| 2013/0176403 A1 * | 7/2013 | Varga | H04N 13/243 13/243 |
| 2013/0328928 A1 | 12/2013 | Yamagishi et al. | |
| 2014/0192148 A1 * | 7/2014 | Georgakis | H04N 19/597 348/42 |
| 2014/0198215 A1 | 7/2014 | Schumm | |
| 2014/0364212 A1 | 12/2014 | Osman et al. | |
| 2015/0094142 A1 | 4/2015 | Stafford | |
| 2015/0124052 A1 * | 5/2015 | Ito | H04N 13/204 348/46 |
| 2016/0014435 A1 | 1/2016 | Cronin et al. | |
| 2016/0065947 A1 * | 3/2016 | Cole | H04N 19/597 348/43 |
| 2016/0227190 A1 * | 8/2016 | Cole | H04N 13/194 |
| 2017/0330365 A1 * | 11/2017 | Adamov | H04L 67/10 |
| 2018/0288393 A1 * | 10/2018 | Yerli | H04N 21/00 |

OTHER PUBLICATIONS

Chen et al., "Choose Your Own Viewpoint: A High-Quality / Low-Complexity Free-Viewpoint 3D Visual System", IEEE ESPA 2012 (Year: 2012).*

Fitzgibbon et al., "Image-Based Rendering Using Image-Based Priors", International Journal of Computer Vision, vol. 63, No. 2, Jul. 2005, pp. 141-151.

Fehn, "Depth-Image-Based Rendering (DIBR), Compression, and Transmission for a New Approach on 3D-TV", Proc. SPIE, Stereoscopic Displays and Virtual Reality Systems, vol. 5291, No. 2 May 21, 2004, pp. 93-104.

Shibata, "Head Mounted Display", Displays, vol. 23, No. 1-2, Apr. 2002, pp. 57-64.

"The Essentials of Multicam Editing in Final Cut Pro", KenStone, Retrieved on Jan. 2, 2018, Webpage available at : http://www.kenstone.net/fcp_homepage/multicam_editing_martin.html.

* cited by examiner

VIRTUAL REALITY DISPLAY

FIELD

This specification relates generally to a method and system for virtual reality display, particularly virtual reality display in which new images, e.g. video images, are generated using available images to render a point-of-view that has not been captured by a camera.

BACKGROUND

Virtual reality is an immersive form of multimedia which involves displaying a virtual world or space within a user device, which is typically a headset, or head mounted display (HMD), worn by the user which has two screens (one for each eye) displaying part of the virtual world dependent on the position and/or orientation of the user detected using sensors. Headphones are also usually provided in the headset providing audio and thereby augmenting the virtual experience. The virtual world may be computer generated from a real world space captured using a suitable camera system.

A multi-camera device may be used to capture the real world space. A multi-camera device comprises two or more cameras, e.g. video cameras, oriented in different respective directions, typically capturing a 360 degree view field. Nokia's OZO® camera is one such device, providing spatial video (and audio) signals for processing and rendering using suitable virtual reality software on a computer system. In a consumption phase, sensor signals received from a HMD are used by the computer system to determine the spatial location and facial orientation of the user within the virtual space, and therefore a field-of-view to render and display to the screens. The field-of-view will be a limited angle, less than the full 360 degree field. The virtual space may be stored in advance of the consumption phase.

SUMMARY

According to one aspect, a method comprises: a method comprising: providing image data from each of at least two multi-camera devices at different locations in a capture space, each multi-camera device including at least two cameras for capturing respective different images in the capture space; providing first positional data indicating the respective fields-of-view of each camera of each multi-camera device; receiving second positional data from a user device indicating the position and orientation of the user device in a virtual space corresponding to the capture space; selecting, based on the first and second positional data, at least one camera from each of at least two of the multi-camera devices; and generating, using the image data from the selected cameras, a synthesised image representing a field-of-view of the virtual space from the position and orientation of said user device for presentation on a display screen of said user device.

The first positional data may comprise the position of each multi-camera device and the relative orientation of each of its cameras.

The generating step may further comprise generating first and second synthesised images for presentation on respective stereoscopic display screens of the user device.

The user device may be a head mounted display comprising means for providing the second positional data.

The multi-camera devices may be configured to capture a 360 degree view.

The selecting step may be performed responsive to the first and second positional data indicating that the user device is between the at least two multi-camera devices.

The selecting step may comprise selecting at least two cameras which are oriented in a close direction as the user device.

The method may further comprise estimating, using the orientation of the user device, its field-of-view, and selecting cameras which are oriented to capture images covering at last part of said field-of-view.

The method may further comprise selecting cameras for which there is no occlusion between the camera and the field-of-view.

The selecting step may further comprise selecting cameras from different multi-camera devices for which the angle between their respective orientations is smaller than a predetermined threshold. The predetermined threshold may be substantially 90 degrees.

The selecting step may comprise selecting first and second cameras, each positioned either side of an axis passing through the user device in its orientation direction, the first and second cameras being those closest, or within a predetermined distance, of the user device on their respective sides.

The selecting step may comprise selecting cameras based on image quality.

The selecting step for generating the second synthesised image may be dependent on the selecting step for generating the first synthesised virtual image.

The selecting step may be dependent on movement of the user device.

The selecting step may be dependent on rotation of the user device.

The selecting step may comprise estimating the computational complexity for generating the synthesised image using a proposed set of cameras, and restricting the number of proposed cameras to maintain said estimated computational complexity below a predetermined threshold.

The multi-camera devices and the user device may be movable in the capture space and each may comprise one or more of a positioning system, an accelerometer and a gyroscope.

The synthesised image may be rendered based on a depth based image rendering algorithm.

The depth based image rendering algorithm may receive and use depth information from a ranging sensor provided on the MCDs.

The synthesised image may be rendered based on a texture-only rendering algorithm.

According to a second aspect, there is provided a computer program comprising instructions that when executed by a computer apparatus control it to perform the method comprising:

providing image data from each of at least two multi-camera devices at different locations in a capture space, each multi-camera device including at least two cameras for capturing respective different images in the capture space;

providing first positional data indicating the respective fields-of-view of each camera of each multi-camera device;

receiving second positional data from a user device indicating the position and orientation of the user device in a virtual space corresponding to the capture space;

selecting, based on the first and second positional data, at least one camera from each of at least two of the multi-camera devices; and generating, using the image data from the selected cameras, a synthesised image representing a field-of-view of the virtual space from the position and orientation of said user device for presentation on a display screen of said user device.

According to a third aspect, there is provided a non-transitory computer-readable storage medium having stored thereon computer-readable code, which, when executed by at least one processor, causes the at least one processor to perform a method, comprising:

providing image data from each of at least two multi-camera devices at different locations in a capture space, each multi-camera device including at least two cameras for capturing respective different images in the capture space;

providing first positional data indicating the respective fields-of-view of each camera of each multi-camera device;

receiving second positional data from a user device indicating the position and orientation of the user device in a virtual space corresponding to the capture space;

selecting, based on the first and second positional data, at least one camera from each of at least two of the multi-camera devices; and generating, using the image data from the selected cameras, a synthesised image representing a field-of-view of the virtual space from the position and orientation of said user device for presentation on a display screen of said user device.

According to a fourth aspect, there is provided an apparatus, the apparatus having at least one processor and at least one memory having computer-readable code stored thereon which when executed controls the at least one processor of an audio capture apparatus:

to provide image data from each of at least two multi-camera devices at different locations in a capture space, each multi-camera device including at least two cameras for capturing respective different images in the capture space;

to provide first positional data indicating the respective fields-of-view of each camera of each multi-camera device;

to receive second positional data from a user device indicating the position and orientation of the user device in a virtual space corresponding to the capture space;

to select, based on the first and second positional data, at least one camera from each of at least two of the multi-camera devices; and to generate, using the image data from the selected cameras, a synthesised image representing a field-of-view of the virtual space from the position and orientation of said user device for presentation on a display screen of said user device.

According to a fifth aspect, there is provided an apparatus configured to perform the method of:

providing image data from each of at least two multi-camera devices at different locations in a capture space, each multi-camera device including at least two cameras for capturing respective different images in the capture space;

providing first positional data indicating the respective fields-of-view of each camera of each multi-camera device;

receiving second positional data from a user device indicating the position and orientation of the user device in a virtual space corresponding to the capture space;

selecting, based on the first and second positional data, at least one camera from each of at least two of the multi-camera devices; and generating, using the image data from the selected cameras, a synthesised image representing a field-of-view of the virtual space from the position and orientation of said user device for presentation on a display screen of said user device.

BRIEF DESCRIPTION OF THE DRAWINGS

Embodiments will now be described, by way of non-limiting example, with reference to the accompanying drawings, in which.

DETAILED DESCRIPTION OF SOME EMBODIMENTS

Embodiments herein relate to virtual reality (VR) methods and systems, in which a user is provided with a video feed representing a captured virtual space. Spatial audio may also be provided but is not essential for understanding the embodiments.

In this context, a virtual space is any computer-generated version of a space, for example a captured real world space, in which a user can be immersed through a visual interface device having one or more display screens, for example a head mounted display (HMD) with a pair of display screens for stereoscopic video images.

In some embodiments, a live feed may be provided by a VR system that has access to a stored version of a real world space previously captured using two or more camera devices in said space, such as multi-camera devices (MCDs). An MCD is any device capable of capturing images simultaneously using two or more cameras. Nokia's OZO® device is an example of an MCD. In the foregoing, any form of MCD may be employed, including for example handheld or mobile MCDs. In some embodiments, the virtual space is stored on memory of the VR system and possibly pre or post-processed by user interaction through a user interface of the system prior to delivery to the HMD. In some embodiments, the virtual space is stored on external memory for access by the VR system.

In some embodiments, a ranging information may be available for each MCD. Such ranging information may be presented as a depth map image. A depth map image may be considered to represent the values related to the distance of the surfaces of the scene objects from a reference location, for example a view point of an observer. A depth map image is an image that may include per-pixel depth information or any similar information. For example, each sample in a depth map image represents the distance of the respective texture sample or samples from the plane on which the camera lies. In other words, if the z axis is along the shooting axis of the cameras (and hence orthogonal to the plane on which the cameras lie), a sample in a depth map image represents the value on the z axis. Since depth map images are generated containing a depth value for each pixel in the image, they can be depicted as grey-level images or images containing only the luma component.

In an example embodiment, the depth map may include depth information associated with the scene. The depth information may be obtained by various means. For example, depth of the 3D scene may be computed from the disparity registered by capturing cameras or colour image sensors. A depth estimation approach, which may also be referred to as stereo matching, includes taking a stereoscopic view as an input and computing local disparities between the two offset images of the view. Since the two input views represent different viewpoints or perspectives, the parallax creates a disparity between the relative positions of scene points on the imaging planes depending on the distance of the points. A target of stereo matching is to extract those disparities by finding or detecting the corresponding points between the images. Stereo matching may be performed based on various approaches. For example, in a block or template matching approach each image is processed pixel by pixel in overlapping blocks, and for each block of pixels a horizontally localized search for a matching block in the offset image is performed. Once a pixel-wise disparity is computed, the corresponding depth value z may be calculated by the following equation:

$$z = \frac{f \cdot b}{d + \Delta d}$$

where, f is the focal length of the camera and b is the baseline distance between cameras. Further, d may be considered to refer to the disparity observed between the two cameras or the disparity estimated between corresponding pixels in the two cameras. The camera offset Δd may be considered to reflect a possible horizontal misplacement of the optical centres of the two cameras or a possible horizontal cropping in the camera frames due to pre-processing. However, since the algorithm is based on block matching, the quality of a depth-through-disparity estimation is content dependent and very often not accurate. For example, no straightforward solution for depth estimation is possible for image fragments that are featuring very smooth areas with no textures or large level of noise.

Alternatively or in addition to the above-described stereo view depth estimation, the depth value may be obtained using the time-of-flight (TOF) principle for example by using a camera which may be provided with a light source, for example an infrared emitter, for illuminating the scene. Such an illuminator may be arranged to produce an intensity modulated electromagnetic emission for a frequency between e.g. 10-100 MHz, which may require LEDs or laser diodes to be used. Infrared light may be used to make the illumination unobtrusive. The light reflected from objects in the scene is detected by an image sensor, which may be modulated synchronously at the same frequency as the illuminator. The image sensor may be provided with optics; a lens gathering the reflected light and an optical band pass filter for passing only the light with the same wavelength as the illuminator, thus helping to suppress background light. The image sensor may measure for each pixel the time the light has taken to travel from the illuminator to the object and back. The distance to the object may be represented as a phase shift in the illumination modulation, which can be determined from the sampled data simultaneously for each pixel in the scene.

Alternatively or in addition to the above-described stereo view depth estimation and/or TOF-principle depth sensing, depth values may be obtained using a structured light approach which may operate for example approximately as follows. A light emitter, such as an infrared laser emitter or an infrared LED emitter, may emit light that may have a certain direction in a 3D space (e.g. follow a raster-scan or a pseudo-random scanning order) and/or position within an array of light emitters as well as a certain pattern, e.g. a certain wavelength and/or amplitude pattern. The emitted light is reflected back from objects and may be captured using a sensor, such as an infrared image sensor. The image/signals obtained by the sensor may be processed in relation to the direction of the emitted light as well as the pattern of the emitted light to detect a correspondence between the received signal and the direction/position of the emitted lighted as well as the pattern of the emitted light for example using a triangulation principle. From this correspondence a distance and a position of a pixel may be concluded.

It is to be understood that the above-described depth estimation and sensing methods are provided as non-limiting examples and embodiments may be realized with the described or any other depth estimation and sensing methods and apparatuses.

What is presented by the VR system to the HMD is determined by data signals received from the HMD indicative of the point-of-view of the user, which indicates what sub-portion of the virtual space, or field-of-view, they are currently looking at. The field-of-view may be determined using one or both of the HMD's spatial position and its orientation which indicates the facial/eye direction. For ease of reference, we refer to these signals as HMD position signals or position data. Reference to HMD position and HMD position data refers to any parameter indicative of user positioning and/or facial/eye orientation within the virtual space which can be used to determine the point-of-view and therefore the field-of-view the user wishes to view at a particular time.

Position can include the spatial position within the virtual space, for example in terms of Cartesian or polar coordinates, or distance from a reference position. Position can also be indicative of orientation of the HMD in terms of horizontal and/or vertical direction relative to a reference direction, e.g. 10 degrees from a reference direction.

The HMD may incorporate a positioning system, for example one or more of (a) a GPS receiver, (b) an inertial navigation system (INS) which uses motion/pressure sensors such as one or more gyroscopes, accelerometers, barometers etc. to interpret the location and orientation difference of the HMD relative to a reference location/orientation and (c) a radio positioning tag.

Regarding (c), the position data may be determined by the HMD carrying a radio positioning tag which may directly or indirectly deliver data indicative of the user position and/or orientation to the VR system. The positioning tag may be a High Accuracy Indoor Positioning (HAIP) tag which works in association with one or more HAIP locators. HAIP systems use Bluetooth Low Energy (BLE) communication between the tags and the one or more locators. In general, such direction of arrival (DoA) positioning systems are based on (i) a known location and orientation of the or each locator, and (ii) measurement of the DoA angle of the signal from the respective tag towards the locators in the locators' local co-ordinate system. Based on the location and angle information from one or more locators, the position of the tag may be calculated using geometry.

It will be appreciated that the HMD positioning system may be used to track movement as the HMD's position and orientation changes over time. The HMD positioning system may be used to identify the current point-of-view and hence the field-of-view which may be updated as the user changes position over time. A field-of-view may be any sub-portion of the available spatial field which represents what the user currently sees from the point-of-view. The field-of-view is typically less than 360 degrees and more likely to be in the order of 70-100 degrees. As the user and HMD changes position and/or orientation, a different field-of-view may be delivered in real time or near real time. The different field-of-view may overlap with a previous one.

The HMD may comprise two digital screens for displaying stereoscopic video images of the virtual world in front of respective eyes of the user. Embodiments herein are not limited to a particular type of HMD.

Embodiments herein relate to generating new images, e.g. video images, from one or more points-of-view which are different from known positions of MCDs in the capture space. The new images may be referred to as synthesised images because they show a field-of-view which has not been captured by any single camera. When a user with HMD is positioned, or moves, between where the MCDs were placed during the capture phase, they will receive synthesised images based on their current point-of-view rather than images captured from the MCDs' point-of-view. The aim is to give a more realistic visual experience. The synthesised images are typically texture based or based on respective depth information. Background information on creating synthesised images is disclosed in Fitzgibbon, Andrew et al "Image-based rendering using image-based priors", International Journal of Computer Vision, 63.2 (2005): 141-151, and also in Fehn, Christoph "Depth-image-based rendering (DIBR), compression, and transmission for a new approach on 3D-TV", Electronic Imaging 2004, International Society for Optics and Photonics, 2004.

Figure 1:
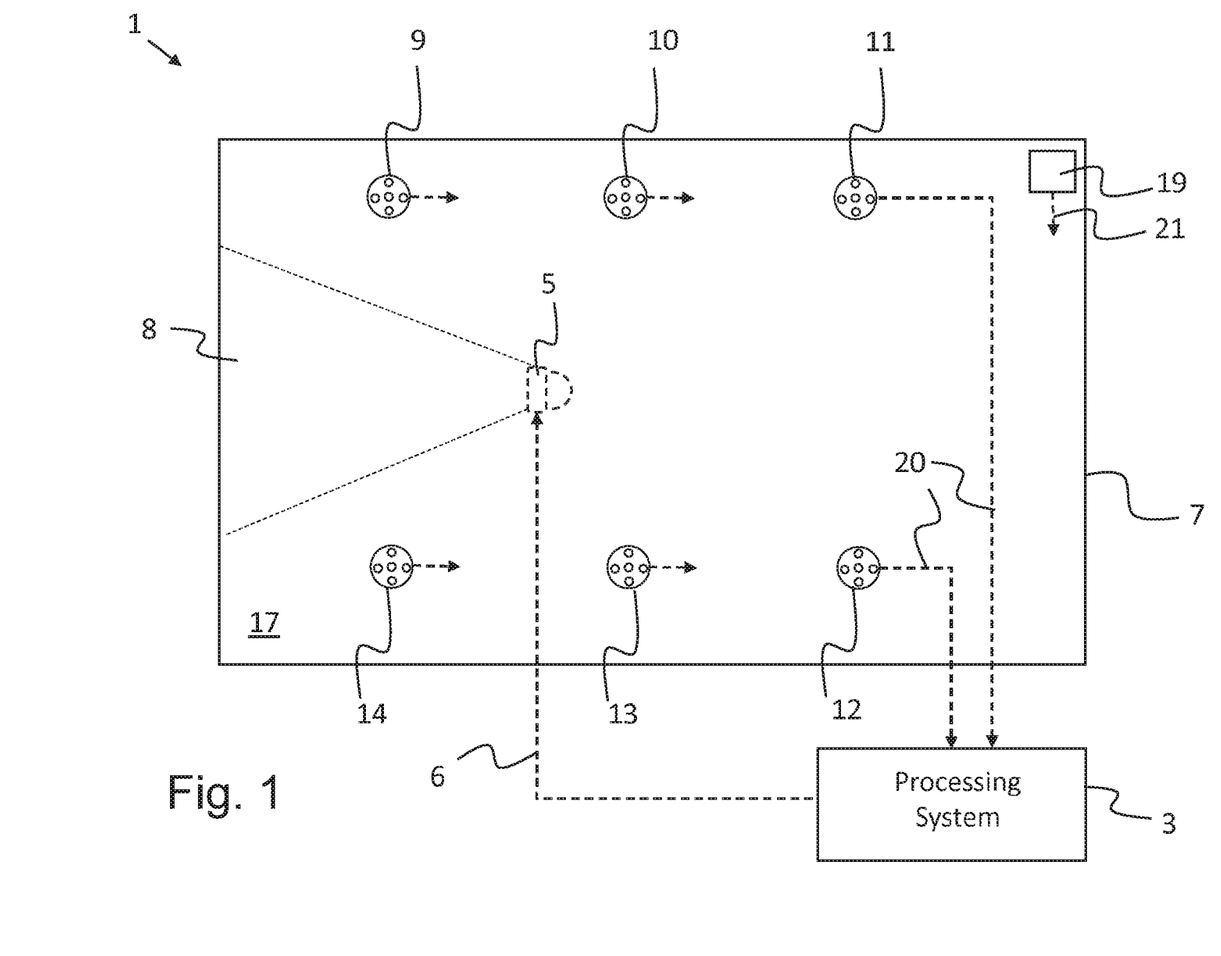
FIG. 1 is a top-plan view of a real world capture situation for creating a virtual reality version, including a processing system for rendering a virtual space according to embodiments.

Referring to FIG. 1, an overview of a VR capture scenario 1 is shown together with a processing system 3 for rendering VR video content and providing said content to a user-worn HMD 5. The HMD 5 is for convenience shown overlaid, but it will be appreciated that the capture and consumption phases may be temporally distinct. In embodiments herein, the VR video content may be rendered and delivered to the HMD 5 after the capture phase is complete, i.e. in an offline mode. In other embodiments, the rendered content from MCDs are stored in a server and requested by the HMD 5 in real time. In this scenario, the processing load is on the server side as opposed to the case where the rendered data is transmitted to the HMD 5 and all processing is performed at the HMD.

FIG. 1 shows in plan-view a real world space 7 which may be for example a room, concert hall or sports venue. The processing system 3 is applicable to any real world space, however.

A plurality of MCDs 9-14 are provided for video (and possibly audio) capture. The MCDs 9-14 are disposed over a floor 17 of the space 7 at different spatial locations. The MCDs 9-14 may be of any type, and it is assumed for convenience that the MCDs are Nokia OZO® devices. One or more MCDs 9-14 may be fixed in their location and/or may move over time. Spatial position and movement tracking of each respective MCD 9-14 may be determined using any of the above methods described above for the HMD 5. That is, each MCD 9-14 may comprise a positioning system which may for example include one or more of a GPS receiver, an inertial navigation system (INS) and/or a radio positioning tag, e.g. a HAIP tag. Reference numeral 19 indicates a HAIP locator which may be used to compute via wireless signals from each HAIP tag (if used) the respective positions of the MCDs 9-14 and/or the HMD 5 for sending to the processing system 3 over a signal line 21. Otherwise, the position data from each MCD 9-14 may be sent to the processing system 3 over respective signal lines 20.

In the consumption phase, the HMD 5 comprises one or more of the positioning systems described above for sending position data to the processing system 3 using a signal line 6. The processing system 3 may determine the position and orientation of the HMD 5 to determine a current point-of-view and therefore the current field-of-view 8.

Figure 2:
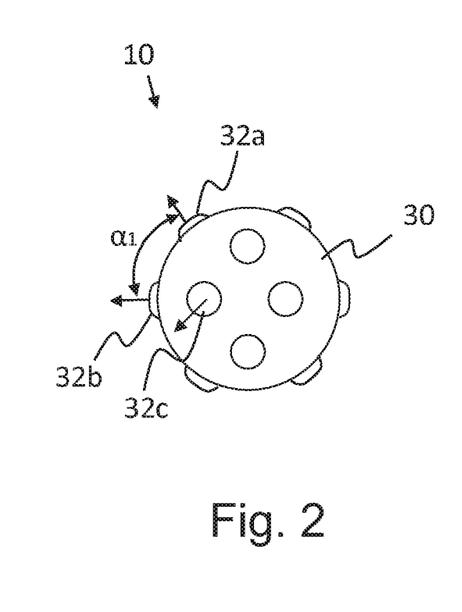
FIG. 2 is a side view of a multi-camera device used in embodiments for the capture of the real world space shown in FIG. 1.

Referring to FIG. 2, one MCD 10 is shown. The MCD 10 comprises a substantially spherical body 30 over which is distributed a plurality of cameras 32$a$-$n$ (where n is the total number of cameras) oriented in respective directions as indicated by the arrows. For example, the horizontal cameras may be substantially 60 degrees apart. Each of the cameras 32$a$-$n$ is a video camera capable of capturing both still and moving (video) images. Each camera 32$a$-$n$ may comprise a wide-angle lens, e.g. a fish-eye lens, providing capture of a substantially 180 degree field-of-view in both horizontal and vertical directions, and possibly beyond. The field-of-view is the area or volume of the capture space covered and therefore captured by the camera. The substantially even distribution of cameras 32$a$-$n$ over the spherical body 30 make it possible to capture a 360 field-of-view with image overlap.

The angle $\alpha 1$ between all camera combinations is known and may be stored locally or at the processing system 3 which makes it possible to compute the orientations of all cameras 32$a$-$n$ in the space 7 based on knowledge of a reference orientation for the MCD 10 or at least one of its cameras at a given point in time. The angles between all adjacent cameras may or may not be the same, depending on the MCD and its characteristics. Applying this to all of the MCDs 9-14, the processing system 3 may thus store, receive or compute the orientations (and therefore the respective fields-of-view) of the individual cameras 32$a$-$n$ for multiple MCDs over time.

Figure 3:
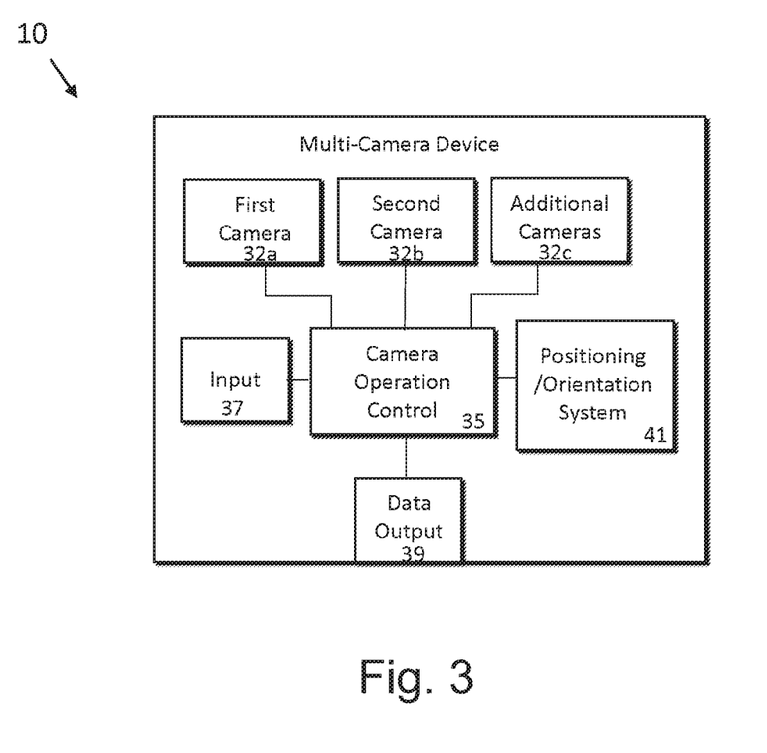
FIG. 3 is a schematic diagram illustrating components of the FIG. 2 multi-camera device.

FIG. 3 is a schematic illustration of MCD 10. The MCD 10 is configured to capture images, e.g. video content using the multiple cameras 32$a$-$n$. The MCD 10 comprises a first camera 32$a$ and a second camera 32$b$. The MCD 10 may also comprise one or more additional cameras 32$c$-$n$. For example the MCD may comprise three, four or more cameras in total.

The MCD 10 may also comprise a camera operation control module 35. The camera operation control module 35 may comprise any suitable combination of software and hardware, such as a microprocessor, RAM and non-volatile memory. The camera operation control module 35 controls each of the cameras 32a-n to capture images and may also control the focus, ISO levels and other imaging parameters of each camera.

The MCD 10 may comprise one or more user inputs 37. For example, the user inputs 37 may allow a user to turn the MCD 10 on and off and to issue commands to capture images or stop capturing images. The user inputs 37 may also allow the user to selectively enable and disable some of the cameras 32a-n of the MCD 10, such that only some of the cameras are enabled at any one time. These use inputs may be accessible on an outer housing of the MCD 10. The user inputs 37 may be in the form of an interface or port to allow the MCD 10 to be connected to, and controlled by, an external apparatus. For example, the user inputs 37 may be a USB port or similar or a wireless transceiver. In some embodiments, a user may control the MCD 10 using an external computing device via one or more of the user inputs 37.

The MCD 10 may also comprise data output hardware 39. This may take the form of an interface or port to facilitate communication with an external device, for example the processing system 3. In some embodiments, the data output 39 and the user input 37 share the same port. The camera operation control module 35 is configured to receive the image data captured by the cameras 32a-n and to control the data output hardware 39 to send the image data to another controller for image processing.

The MCD 10 may also comprise the above-mentioned positioning/orientation system 41 which may for example include one or more of a GPS receiver, an inertial navigation system (INS) and/or a positioning tag, e.g. a HAIP tag. A memory (not shown) may be provided, storing data representing the relative orientations of the cameras 32a-n. The position data may be provided using the camera operation control module 35 to the processing system 3 via the data output hardware 39.

Figure 4:
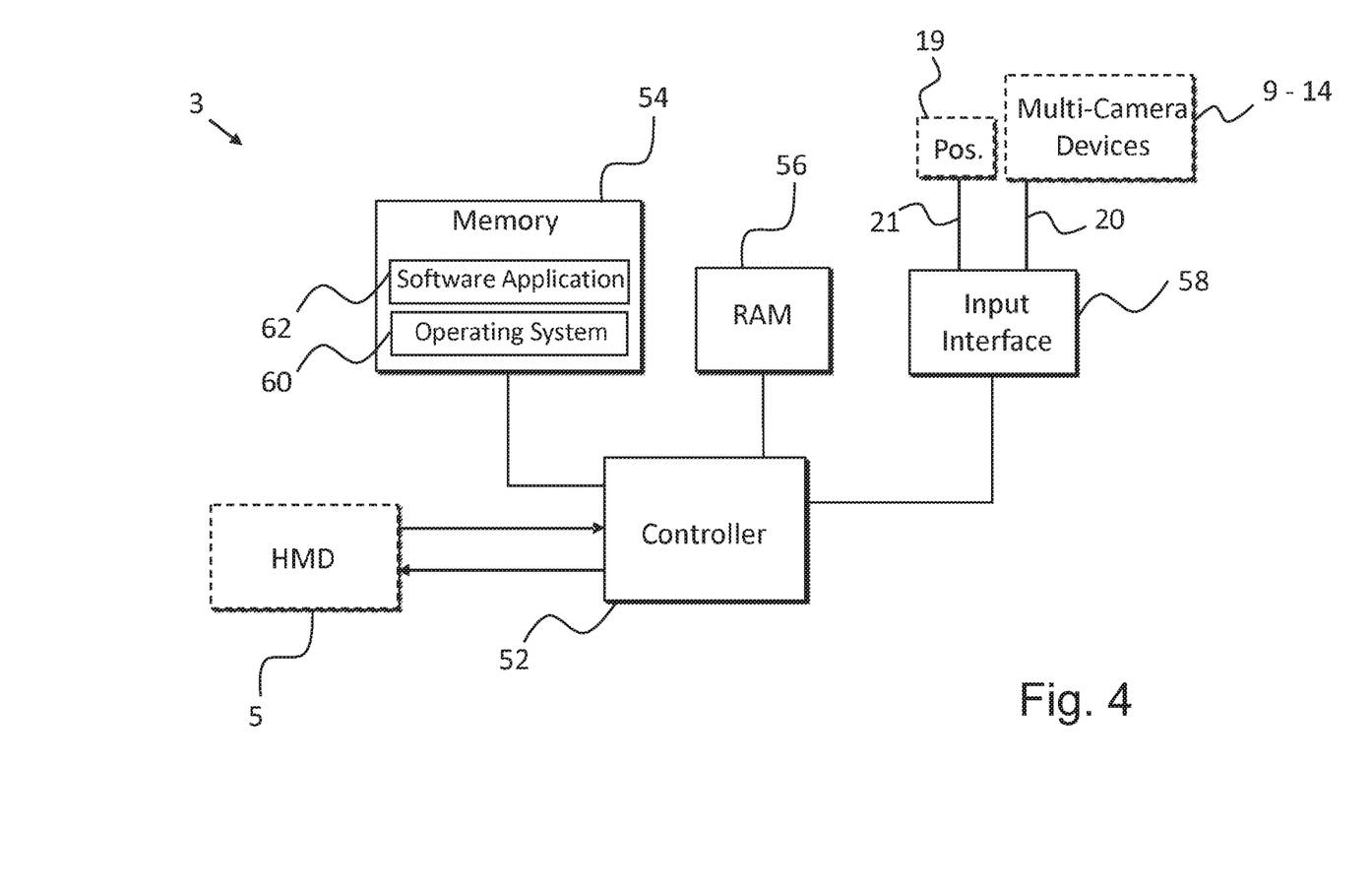
FIG. 4 is a schematic diagram illustrating components of the FIG. 1 processing system according to embodiments.

FIG. 4 is an example schematic diagram of components of the processing system 3. The processing system 3 has a controller 52, a memory 54, RAM 56 and an input interface 58. The controller 52 is connected to each of the other components in order to control operation thereof. In some embodiments, an optional display and user control peripheral(s) may be provided for displaying and controlling a user interface for user control of the processing system 3.

The memory 54 may be a non-volatile memory such as read only memory (ROM) a hard disk drive (HDD) or a solid state drive (SSD). The memory 54 stores, amongst other things, an operating system 60 and one or more software applications 62. The RAM 56 is used by the controller 52 for the temporary storage of data. The operating system 60 may contain code which, when executed by the controller 52 in conjunction with RAM 56, controls operation of each of hardware components of the terminal.

The controller 52 may take any suitable form. For instance, it may be a microcontroller, plural microcontrollers, a processor, or plural processors.

The input interface 58 receives video data from each or selected ones of the MCDs 9-14. In some embodiments, position/orientation data may be received from each or selected ones of the MCDs 9-14. In some embodiments, where a HAIP locator 19 is used to derive the position/orientation data, said data may be received separately.

The software application 62 is configured to generate synthesised images, i.e. new video images, from one or more points of view which are different from the known positions of MCDs 9-14 in the capture space 7. The synthesised images represent a view sector or field-of-view which has not been captured by any single camera or any single MCD 9-14. When a user with HMD 5 is positioned, or moves, between where the MCDs 9-14 were placed during the capture phase, they will receive synthesised images based on the user's approximate or exact point of view rather than images captured from the MCDs' point of view.

Figure 5:
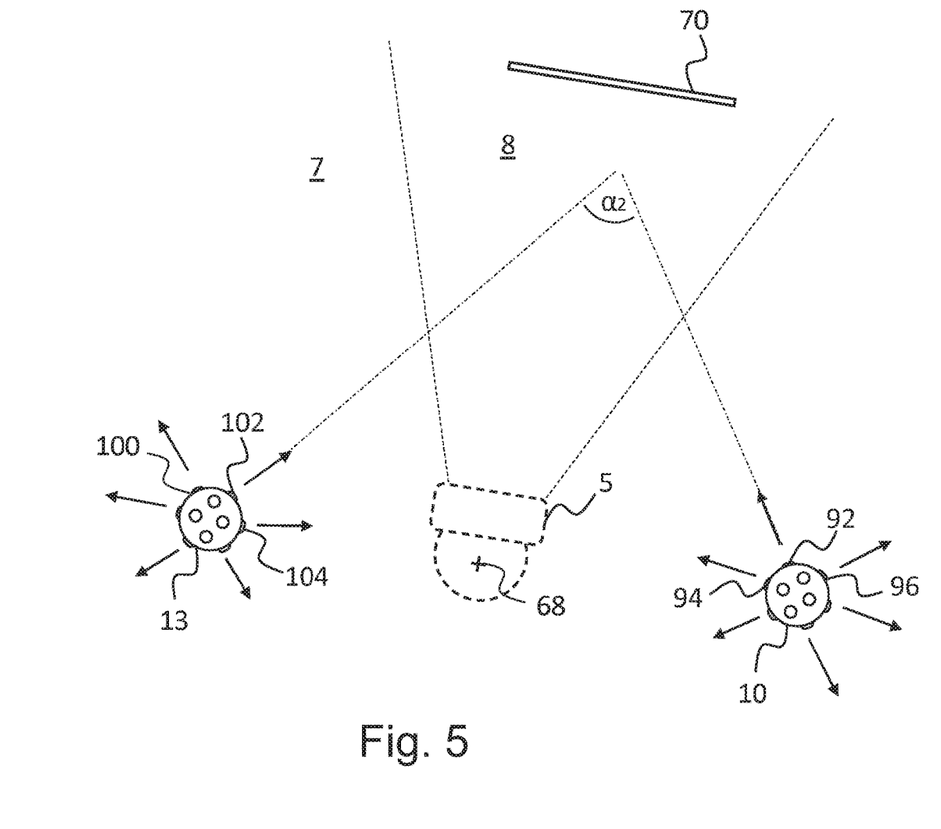
FIG. 5 is a top-plan view of part of a real world capture situation for illustrating the operation of the FIG. 1 processing system according to embodiments.

Referring to FIG. 5, for example, two MCDs 10, 13 are shown in part of the FIG. 1 capture space 7. A subset of cameras 92, 94, 96 are indicated on the first MCD 10 and a subset of cameras 100, 102, 104 on the second MCD 13. Reference numeral 70 indicates an event or object within the capture space 7. In the capture phase of operation, each MCD 10, 13 captures video images simultaneously using two or more of its cameras 92, 94, 96 etc. and 100, 102, 104 etc. which are sent to, and stored on, the memory 54 of the processing system 3. The video data is stored in association with data identifying the cameras 92, 94, 96, 100, 102, 104 of the MCDs 10, 13 from which they were captured. Each camera will capture a different image given their location and angular difference. Each MCD 10, 13 also provides to the processing system 3 position data from their respective positioning system 41 from which the processing system can determine the respective orientations and/or fields-of-view of each camera 92, 94, 96 etc. and 100, 102, 104.

Referring still to FIG. 5, the user wearing the HMD 5 is shown overlaid during the subsequent consumption phase. Position data may be transmitted from the positioning system of the HMD 5 to the processing system 3 to determine, based on location and orientation, the current point-of-view 68 and therefore the field-of-view 8 that the user wishes to see. In the present example, the HMD 5 is spatially between the MCDs 10, 13 and oriented towards the captured event or object 70 which is to be rendered in the virtual space. The HMD 5 may of course be located in any arbitrary spatial location relative to the MCDs 10, 13 and indeed any of the MCDs shown in FIG. 1. There is no upper limit to the number of MCDs.

In some embodiments, the processing system 3 is responsive to identifying that the HMD's 5 position is different from that of the MCDs 10, 13 to generate a synthesised image from the point-of-view 68, which image represents, when rendered, the field-of-view 8. In embodiments herein, the synthesised image is generated using image data from a plurality of cameras, particularly one or more cameras 92, 94, 96 etc. and 100, 102, 104 etc. from two or more different MCDs 10, 13 rather than only one. The cameras 92, 94, 96 etc. and 100, 102, 104 etc. which are employed for image synthesis are determined using one or more selection rules to be described below.

Figure 6:
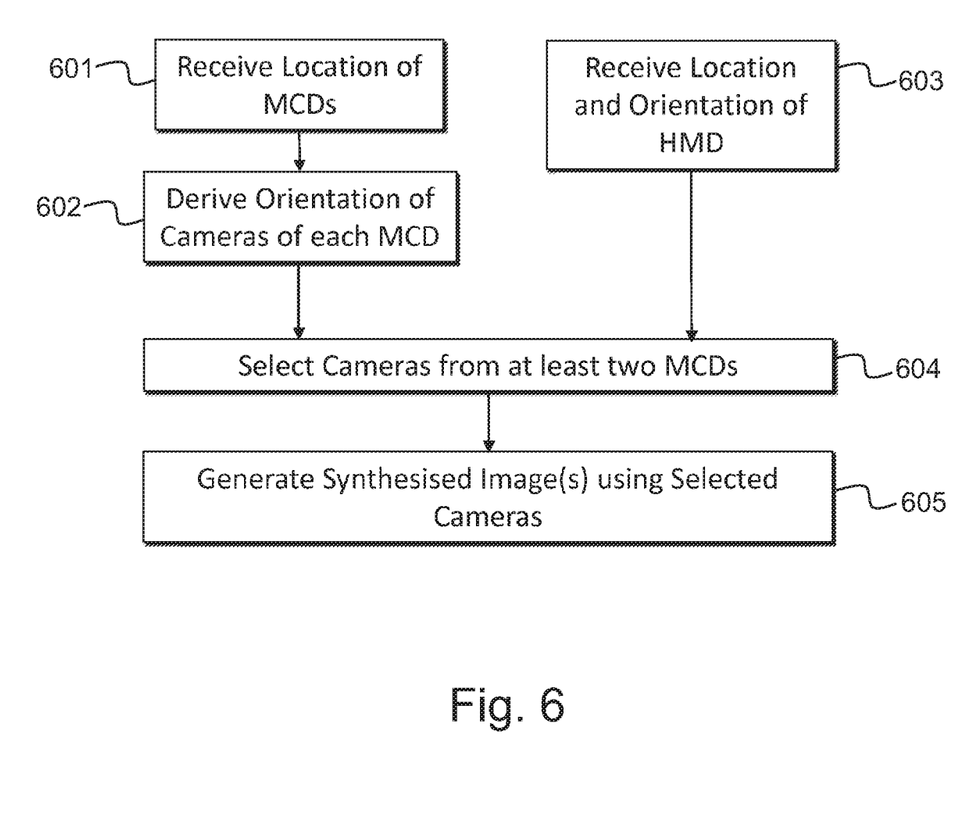
FIG. 6 is a flow diagram showing processing steps of a method performed by the FIG. 1 processing system according to embodiments.

Referring to FIG. 6, processing steps performed by the software application 62 are shown in overview. Said steps are explained with reference to the FIG. 5 example but it will be appreciated that the steps can be applied to a larger number of MCDs, for example as shown in FIG. 1.

In a first step 601 the processing system 3 receives, computes or retrieves from local memory the location of the MCDs 10, 13 using the position data from each. In a second step 602 the processing system receives, computes or retrieves from local memory the orientations of the cameras 92, 94, 96 etc. and 100, 102, 104 etc. for each MCD 10, 13. In some embodiments, these two steps 601, 602 may be performed at the same time. In a third step 603 the current location and orientation of the HMD 5 is received, computed or retrieved based on the current position data from the HMD. In step 604, at least one camera 92, 94, 96 etc. and 100, 102, 104 etc. is selected from each of two or more of the MCDs 10, 13 based on selection rule(s) to be described below. In step 605, a synthesised image is generated from the viewpoint 68 and rendered for display on the display screens of the HMD 5. The process may repeat for subsequent movements of the HMD 5 over time.

It will be appreciated that the order of steps may be rearranged or certain steps performed in parallel in certain situations.

It will also be appreciated that, where more than two MCDs are present, it is not necessary to select camera(s) from every MCD. Selection of camera(s) from only first and second MCDs, and no cameras from the other MCDs, may be appropriate in some embodiments. In other embodiments, selection of a camera from more than two MCDs may be appropriate.

In some embodiments, two synthesised images are generated simultaneously, one adapted for each display screen of the HMD 5 to provide stereoscopic video for the user's left and right eyes.

Figure 7A:
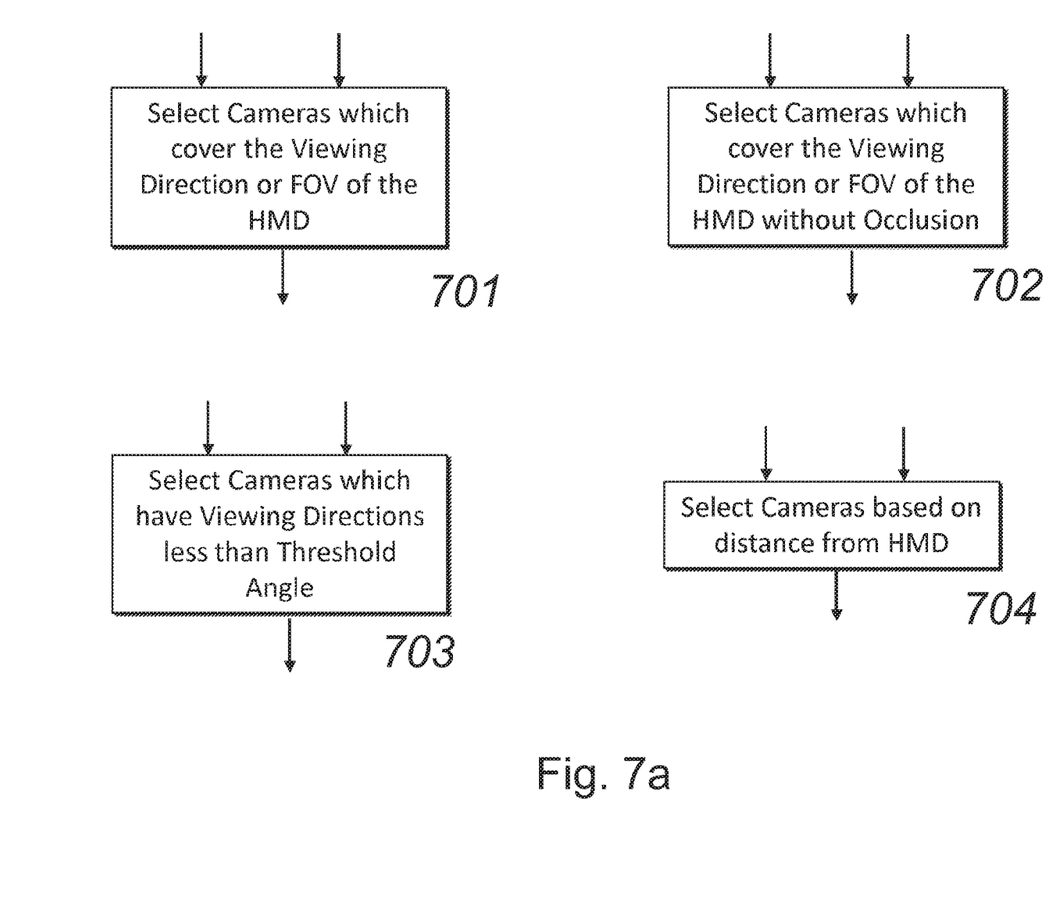
FIGS. 7a and 7b are flow diagrams showing respective selection rules which may comprise part of the FIG. 6 method.
Figure 7B:
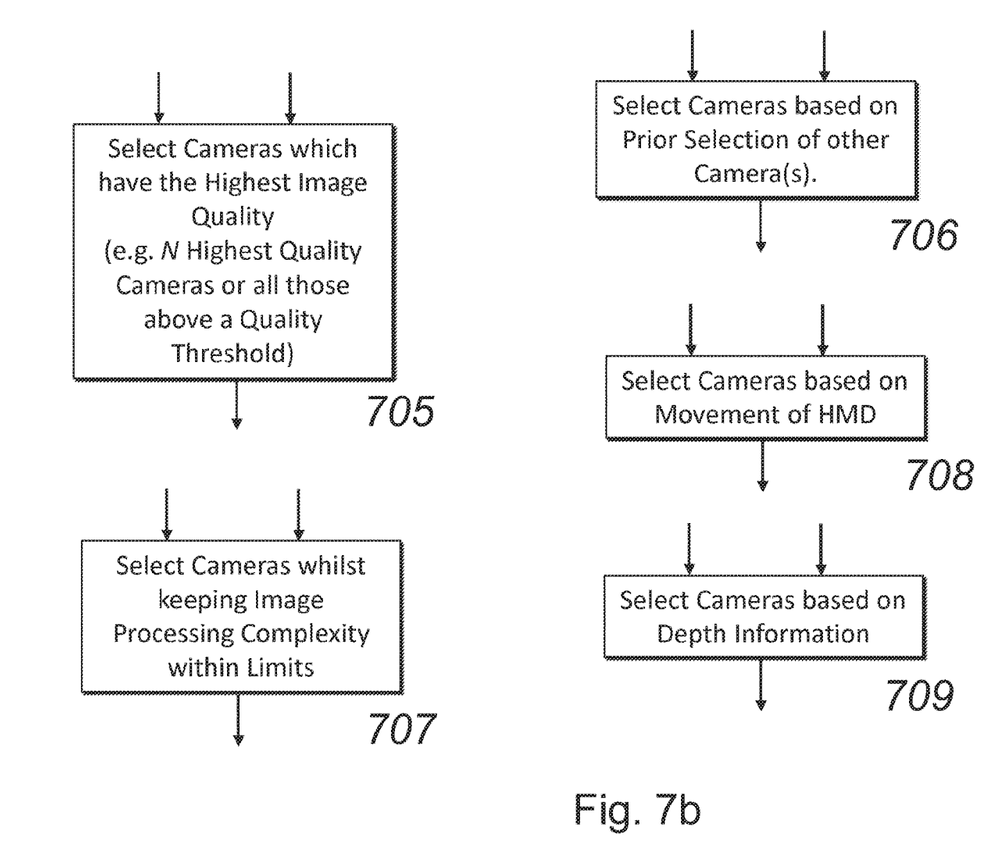

Referring to FIGS. 7a and 7b are flow diagrams showing respective selection rules that may be used individually or in any combination for step 604 will now be explained.

With reference to step 701 in some embodiments at least one camera from the MCDs 10, 13 is selected which covers (in terms of field-of-view) the field-of-view 8 of the HMD 5.

With reference to step 701 in some embodiments there may exist cameras from different MCDs which have a viewing direction close to the viewing direction of the user. Such closeness may be evaluated by calculating the viewing direction angle between the respective cameras in MCDs and the viewing direction of the user. If this angle is smaller than a pre-defined value, then the viewing direction of respective cameras in the MCDs and the user are assumed to be close.

With reference to step 702 in some embodiments at least two cameras from each MCD 10, 13 is selected which covers the field-of-view 8 of the HMD 5 without any occlusion or obstruction between the said camera(s) and the field-of-view 8. This differs from the step 701 rule in that fewer cameras may be selected if there is an occlusion present.

With reference to step 703 in some embodiments at least two cameras from each MCD 10, 13 are selected for which an intersection angle $\alpha_2$ of converging viewing directions (towards the HMD's viewing direction) is less than a predetermined threshold. For example, if the threshold is set at 90 degrees (1.5 times the angle between adjacent camera directions on a given MCD 10, 13) then the cameras 92 and 102 of the MCDs will be selected. Cameras 94 and 104 will not be selected as their intersection angle will be greater than 90 degrees. In situations where more than one camera from each MCD 10, 13 intersects below this threshold, then the camera pairing having the smallest angle may be selected.

With reference to step 704 in some embodiments at least two cameras from each MCD 10, 13 are selected based on the respective distance between the cameras and the HMD 5, or each eye position within the HMD 5. For example, it may be assumed that the smaller the distance from the HMD 5, the better the rendering result. As mentioned above, this rule may be applied with other rules, for example to determine that cameras 94 and 104 are selected over cameras 92 and 102 because they are closer to the HMD 5.

With reference to step 705 in some embodiments at least two cameras from each MCD 10, 13 are selected which have the highest image qualities, e.g. above a quality threshold and/or one camera from each MCD 10, 13 which has the highest quality.

With reference to step 706 in some embodiments at least two cameras from one of the MCDs 10, 13 are selected based on prior selection of at least one camera from the other MCD. That is, a camera from one MCD 10, 13 is first selected based on one or more of the other rules, and the camera from the other MCD is then selected in dependence. This may be useful in generating stereoscopic images, i.e. one for each display of the HMD 5, where symmetry of the camera viewing directions is preferred.

With reference to step 707 in some embodiments at least two cameras from each MCD 10, 13 are selected whilst keeping the image processing complexity e.g. when rendering, to a manageable level, e.g. within predetermined limits Whilst the use of many cameras from each MCD 10, 13 may improve the quality of the synthesised images, it will inevitably increase the processing burden to render said images. Accordingly, a trade-off between image quality and processing complexity may be provided.

With reference to step 708 in some embodiments at least two cameras from each MCD 10, 13 are selected based on movement, e.g. rotation, of the HMD 5. A rotation of a given amount, and/or in a given direction, may result in camera selection which is different than rotation of another amount, and/or in a different direction.

With reference to step 709 in some embodiments at least one camera from each MCD 10, 13 is equipped with a ranging sensor (to capture the depth information of the scene) and that camera(s) may have preference to be selected as the depth information brings gain in the synthesising process.

Figure 8:
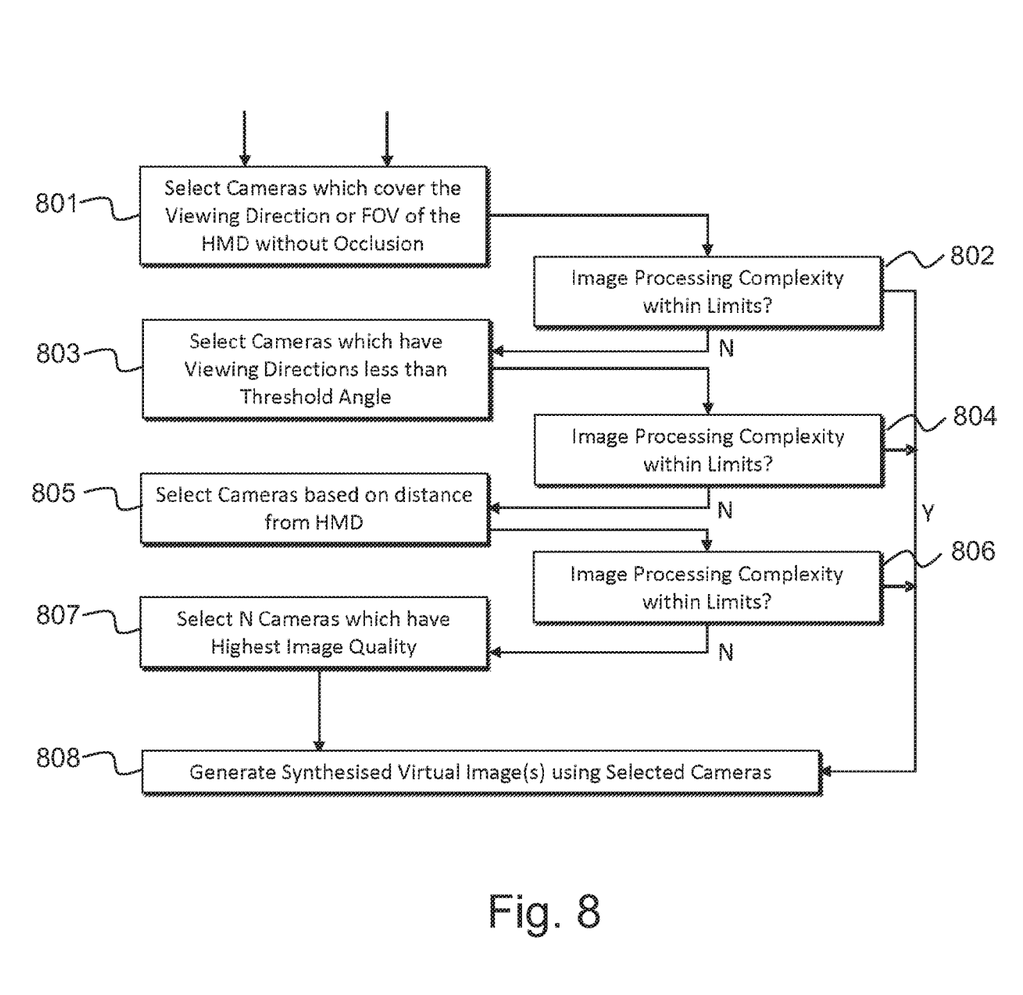
FIG. 8 is a flow diagram showing processing steps comprising a combined set of selection rules.

FIG. 8 is a flow diagram showing how a number of the above selection rules may be combined, whilst keeping image processing complexity within predetermined limits.

In step 801 one or more cameras from each MCD 10, 13 is selected which covers the field-of-view 8 without occlusion. In step 802 it is determined if the resulting selection keeps the processing complexity within predetermined limits. If yes, then the method passes to step 808 which sets the final selection. If outside the limits, then in step 803 the number of cameras is refined to those having a viewing direction less than the predetermined threshold level, e.g. 90 degrees. In step 804 the step 802 determination is repeated. If still outside the limits, then step 805 is performed which refines the number of cameras further based on distance from the HMD. In step 806 the step 802 determination is repeated. If still outside the limits, then step 807 is performed which refines the number of cameras still further to select those from each MCD 10, 13 having the highest image quality. The method then proceeds to step 808 which sets the final selection.

In some embodiments, the FIG. 8 method may have a further condition that ensures that the quality of the synthesised image is above a threshold quality. For example, following, or at the same time as, step 808, if the synthesised image is below the threshold quality, then the process returns to a previous iteration whereby one or more further images is added to the current selection (e.g. using the next-most high quality image which is currently unselected) before a new synthesised image is generated and tested against the threshold quality once again.

As will be appreciated, for each MCD 10, 13 multiple cameras are available and so the freedom to choose the best viewing direction(s) to synthesise the required HMD field-of-view is increased.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
   providing image data from at least two multi-camera devices located at different locations in a capture space, the at least two multi-camera devices including a plurality of cameras for capturing respective different images in the capture space;
   providing a first positional data indicating respective fields-of-view of the plurality of cameras of the at least two multi-camera devices;
   receiving a second positional data from a user device indicating a position and an orientation of the user device in a virtual space corresponding to the capture space;
   estimating a computational complexity for generating a synthesised image using two or more cameras of the plurality of cameras;
   restricting the two or more cameras of the plurality of cameras to a maximum number of cameras to maintain the estimated computational complexity so as to satisfy a predetermined threshold;
   selecting, based on the first and second positional data, two or more other cameras from the plurality of cameras of the at least two multi-camera devices; and
   generating, using image data from the two or more other cameras, the synthesised image representing a field-of-view of the virtual space from the position and orientation of the user device for presentation on a display screen of the user device.

2. The method of claim 1, wherein the first positional data comprises the position data of the at least two multi-camera devices and a relative orientation of the at least two cameras of the at least two multi-camera devices.

3. The method of claim 1, wherein the generating comprises generating first and second synthesised images for presentation on a respective stereoscopic display screens of the user device.

4. The method of claim 1, wherein the selecting is performed responsive to the first and second positional data indicating that the user device is between the at least two multi-camera devices.

5. The method of claim 1, further comprising:
   estimating, using the orientation of the user device, a field-of-view of the user device; and
   selecting the at least one camera from the at least two cameras which are oriented to capture images covering at least a part of the field-of-view of the user device.

6. The method of claim 5, wherein an angle between respective orientations of the at least one camera of the at least two cameras is smaller than a predetermined threshold.

7. The method of claim 1, wherein the at least one camera of the at least two cameras comprises a first and a second camera, and wherein the first and second cameras are positioned on either side of an axis passing through the user device, the first and second cameras being closest, or within a predetermined distance, of the user device on the respective sides.

8. The method of claim 1, wherein the synthesised image is rendered based on a depth based image rendering algorithm, and wherein the depth based image rendering algorithm receives and uses depth information from a ranging sensor provided on the at least two multi-camera devices.

9. The method of claim 1, wherein the restricting the at least one camera of the at least two cameras to the maximum number of cameras to maintain the estimated computational complexity so as to satisfy the predetermined threshold comprises restricting the at least one camera of the at least two cameras to the maximum number of cameras to maintain the estimated computational complexity so as to satisfy the predetermined threshold while maintaining a synthesised image quality so as to satisfy a predetermined value.

10. A non-transitory computer-readable storage medium having stored thereon computer-readable code, which, when executed by at least one processor, causes the at least one processor to:
   provide image data from at least two multi-camera devices located at different locations in a capture space, the at least two multi-camera devices including a plurality of cameras for capturing respective different images in the capture space;
   provide a first positional data indicating respective fields-of-view of the plurality of cameras of the at least two multi-camera devices;
   receive a second positional data from a user device indicating a position and an orientation of the user device in a virtual space corresponding to the capture space;
   estimate a computational complexity for generating a synthesised image using two or more cameras of the plurality of cameras;
   restrict the two or more cameras of the plurality of cameras to a maximum number of cameras to maintain the estimated computational complexity so as to satisfy a predetermined threshold;
   select, based on the first and second positional data, two or more other cameras from the plurality of cameras of the at least two multi-camera devices; and
   generate, using image data from the two or more other cameras, the synthesised image representing a field-of-view of the virtual space from the position and orientation of the user device for presentation on a display screen of the user device.

11. The non-transitory computer-readable storage medium of claim 10, wherein the first positional data comprises the position data of the at least two multi-camera devices and a relative orientation of the at least two cameras of the at least two multi-camera devices.

12. An apparatus comprising at least one processor and at least one memory storing computer program code, the at least one memory and the computer program code configured to, with the processor, cause the apparatus to:
   provide image data from at least two multi-camera devices located at different locations in a capture space, the at least two multi-camera devices including a plurality of cameras for capturing respective different images in the capture space;
   provide a first positional data indicating respective fields-of-view of the plurality of cameras of the at least two multi-camera devices;
   receive a second positional data from a user device indicating a position and an orientation of the user device in a virtual space corresponding to the capture space;

estimate a computational complexity for generating a synthesised image using two or more cameras of the plurality of cameras;

restrict the two or more cameras of the plurality of cameras to a maximum number of cameras to maintain the estimated computational complexity so as to satisfy a predetermined threshold;

select, based on the first and second positional data, two or more other cameras from the plurality of cameras of the at least two multi-camera devices; and generate, using image data from the two or more other cameras, the synthesised image representing a field-of-view of the virtual space from the position and orientation of the user device for presentation on a display screen of the user device.

13. The apparatus of claim 12, wherein the first positional data comprises the position data of the at least two multi-camera devices and a relative orientation of the at least two cameras of the at least two multi-camera devices.

14. The apparatus of claim 12, wherein, to generate the synthesised image, the apparatus is further caused to generate first and second synthesised images for presentation on a respective stereoscopic display screens of the user device.

15. The apparatus of claim 12, wherein selection of the at least one camera from the at least two cameras is performed in response to the first and second positional data indicating that the user device is between the at least two multi-camera devices.

16. The apparatus of claim 12, where in the apparatus further caused to:

estimate, using the orientation of the user device, a field-of-view of the user device; and select the at least one camera from at least two cameras which are oriented to capture images covering at least a part of the field-of-view of the user device.

17. The apparatus of claim 16, wherein an angle between respective orientations of the at least one camera of the at least two cameras is smaller than a predetermined threshold.

18. The apparatus of claim 12, wherein the at least one camera of the at least two cameras comprises a first and a second camera, and wherein the first and second cameras are positioned on either side of an axis passing through the user device, the first and second cameras being closest, or within a predetermined distance, of the user device on the respective sides.

19. The apparatus of claim 12, wherein the synthesised image is rendered based on a depth based image rendering algorithm, and wherein the depth based image rendering algorithm receives and uses depth information from a ranging sensor provided on the at least two multi-camera devices.

20. The apparatus of claim 12, wherein the at least one memory and the computer program code being configured to, with the processor, cause the apparatus to restrict the at least one camera of the at least two cameras to the maximum number of cameras to maintain the estimated computational complexity so as to satisfy the predetermined threshold comprises the apparatus being configured to restrict the at least one camera of the at least two cameras to the maximum number of cameras to maintain the estimated computational complexity so as to satisfy the predetermined threshold while maintaining a synthesised image quality so as to satisfy a predetermined value.

* * * * *